United States Patent [19]

Fulton et al.

[11] Patent Number: 5,359,890
[45] Date of Patent: Nov. 1, 1994

[54] INTEGRATED ELECTRONIC PRIMARY FLIGHT DISPLAY

[75] Inventors: Stephen D. Fulton, Federal Way, Wash.; Thomas M. Leard, Carefree, Ariz.

[73] Assignee: Honeywell Inc., Minneapolis, Minn.

[21] Appl. No.: 57,720

[22] Filed: May 4, 1993

[51] Int. Cl.⁵ .............................................. G01C 21/00
[52] U.S. Cl. ................................... 73/178 R; 340/973
[58] Field of Search ............. 73/178 R, 178 T, 178 H; 340/973, 975, 977, 978, 974

[56] References Cited

U.S. PATENT DOCUMENTS

| | | | |
|---|---|---|---|
| D. 257,832 | 1/1981 | Flint et al. | D10/67 |
| D. 290,937 | 7/1987 | Devino | D10/67 |
| 2,660,977 | 12/1953 | Gordon | 116/124 |
| 2,685,226 | 8/1954 | Crane | 88/24 |
| 3,098,381 | 7/1963 | Little et al. | 73/179 |
| 3,537,086 | 10/1970 | Andresen, Jr. | 340/198 |
| 3,545,269 | 12/1970 | Sherbert, Jr. | 73/178 |
| 3,624,366 | 11/1971 | Angus et al. | 235/150 |
| 3,890,614 | 6/1975 | Argentieri et al. | 343/5 |
| 4,112,413 | 9/1978 | Muhs et al. | 340/27 |
| 4,247,843 | 1/1981 | Miller et al. | 340/27 |
| 4,283,705 | 8/1981 | James et al. | 340/27 |
| 4,326,189 | 4/1982 | Crane | 340/27 |
| 4,583,094 | 4/1986 | Mosier | 340/975 |
| 4,626,851 | 2/1986 | Tooze | 340/975 |
| 4,860,007 | 8/1989 | Konicke et al. | 340/173 |
| 5,136,301 | 8/1992 | Bechtold et al. | 340/977 |
| 5,250,947 | 10/1993 | Worden et al. | 340/973 |

OTHER PUBLICATIONS

Aircraft Instrumentation, McGraw-Hill Encyclopedia of Science and Technology, pp. 286-293.

*Primary Examiner*—Donald Woodiel
*Attorney, Agent, or Firm*—Gregory A. Bruns

[57] ABSTRACT

One side of a primary flight display has an elongated vertically disposed airspeed dial display which provides global or macro airspeed information. A rolling drum display provides a digital display of a present value of airspeed. An elongated vertically disposed altitude dial display is located on a second side of the primary flight display. The second dial display is configured to provide a predetermined amount of rotation of the pointer for a lo predetermined change in altitude. A second rolling drum display provides a digital present value of altitude. The elongated dial displays provide greatly expanded display areas and improved readout resolution.

11 Claims, 3 Drawing Sheets

INTEGRATED ELECTRONIC PRIMARY FLIGHT DISPLAY

BACKGROUND OF THE INVENTION

The present invention relates generally to aircraft flight instrument systems and specifically to the airspeed indicator display portion and the altitude indicator display portion of a primary flight display.

Effective flight management is closely related to providing accurate and timely information to the pilot. The nature of the pilot's various tasks determines the general types of data which must be available. It is important to provide these data in a form best suited for use so that the pilot is not required to accomplish extensive mental processing before information can be used. If this occurs, then more information can be presented and utilized with less effort in mental processing. This can be expected to translate into fewer pilot errors. Computer generated displays offer significant advances in this direction.

Current electronic primary flight displays (PFD's) have a conventional attitude-director indicator (ADI) which consumes most of the available display area. The available display space for air data instruments is restricted to two strips on either side of the ADI. In the past, many display designers have settled upon the display format of the vertical tape presentation of airspeed and altitude.

Vertical tape air data displays have existed since before the advent of electronic display formats. There has been much debate about these displays and they have not been generally accepted as being equal in readability and ease of data interpretation to the round dial format. One factor that may have contributed to some acceptability of vertical tape displays could be their initial airframe application to large, stable, long range aircraft. These aircraft have to make few take off's and landings, and require virtually no significant enroute maneuvering. In this application, the data transfer from the tape displays has been satisfactory. However, application of tapes to smaller, dynamic airframes, with dynamic missions, has proven to not be as acceptable.

The general preference for the round dial format display apparently stems in part from our inherent societal training of reading round dials, e.g., clocks, speedometers, gas gauges and other dials where the markings or indices of the dial are fixed and a movable pointer or indicator moves relative to the fixed markings. However, the round or partially round dial format conveys information not only because of the position of the movable indicator relative to a fixed marking, but also because of the position of the indicator relative to the entire dial or simply the direction in which the movable indicator is pointing. This is illustrated by the existence of clock faces without numerals and in some instances clockfaces without any fixed markings. Notwithstanding the pilots societal background and experience with round style dials, pilots have learned how to satisfactorily use vertical tape displays. However, the experiences with dynamic airframes in the work load demand on the pilot to interpret the vertical tape data serves to still raise the general question of mental workload demand caused by vertical tape air data displays.

Also, information is conveyed by the round dial format due to direction and rate of movement or rotation of the movable indicator or pointer. Rate of movement is quite useful in the control of an aircraft. The round dial allows the pilot to judge the rate of movement towards a specific value e.g. airspeed target, or rate of movement through a range of values e.g. altitude changes during a climb and the pilot can evaluate these rate changes while simultaneously appreciating the macro situation with the relative position of the pointer on the dial.

With respect to clocks the usefulness of the terms clockwise and counterclockwise in communicating information is understood and well established. Further with respect to gauges and other round or partially round formats it is commonly understood that indicator movement in a clockwise direction or rotation indicates an increase and movement in a counterclockwise direction indicates a decrease.

Vertical tape formats, on the other hand, typically display information by moving the "dial", i.e., the scale or tape, and leaving the indicator, i.e. pointer, fixed. This approach is contrary to our previous societal experience and training and therefore does not represent good human factors engineering. However, the need for maximum data resolution in PFD's coupled with the reality of limited linear physical space has forced the display designer to this fixed pointer and moving tape combination.

A second approach to PFD's is to use a very large display area and to provide the altimeter and airspeed information in a round dial format. In addition to requiring a much larger display area, this approach results in a display that is no longer aligned in the traditional and widely accepted "basic T" format. The "basic T" flight instrument format is one in which the airspeed, attitude, altimeter and heading information form the shape of the letter "T" on the PFD.

Thus, a need exists for a PFD that provides the advantages of a round dial format for airspeed and altimeter information in the display space adjacent to a typical centrally located attitude director indicator while preserving the "basic T" instrument format.

SUMMARY OF THE INVENTION

The present invention solves these and other needs by providing a primary flight display having a vertically elongated airspeed dial display and pointer located on one side of an electronic attitude director indicator (EADI). The elongated dial display provides improved resolution of airspeed readings. In addition it provides information as to the direction of change of airspeed and the rate of change of airspeed. A rolling drum airspeed display provides a display of a present value of airspeed. An altitude display is located on a second side of the PFD with a second vertically elongated dial display having a movable pointer. The second dial and movable pointer are configured to provide a predetermined amount of rotation of the movable indicator for a predetermined change in altitude. A second rolling drum display provides a digital present value of altitude.

DETAILED DESCRIPTION

Figure 1:
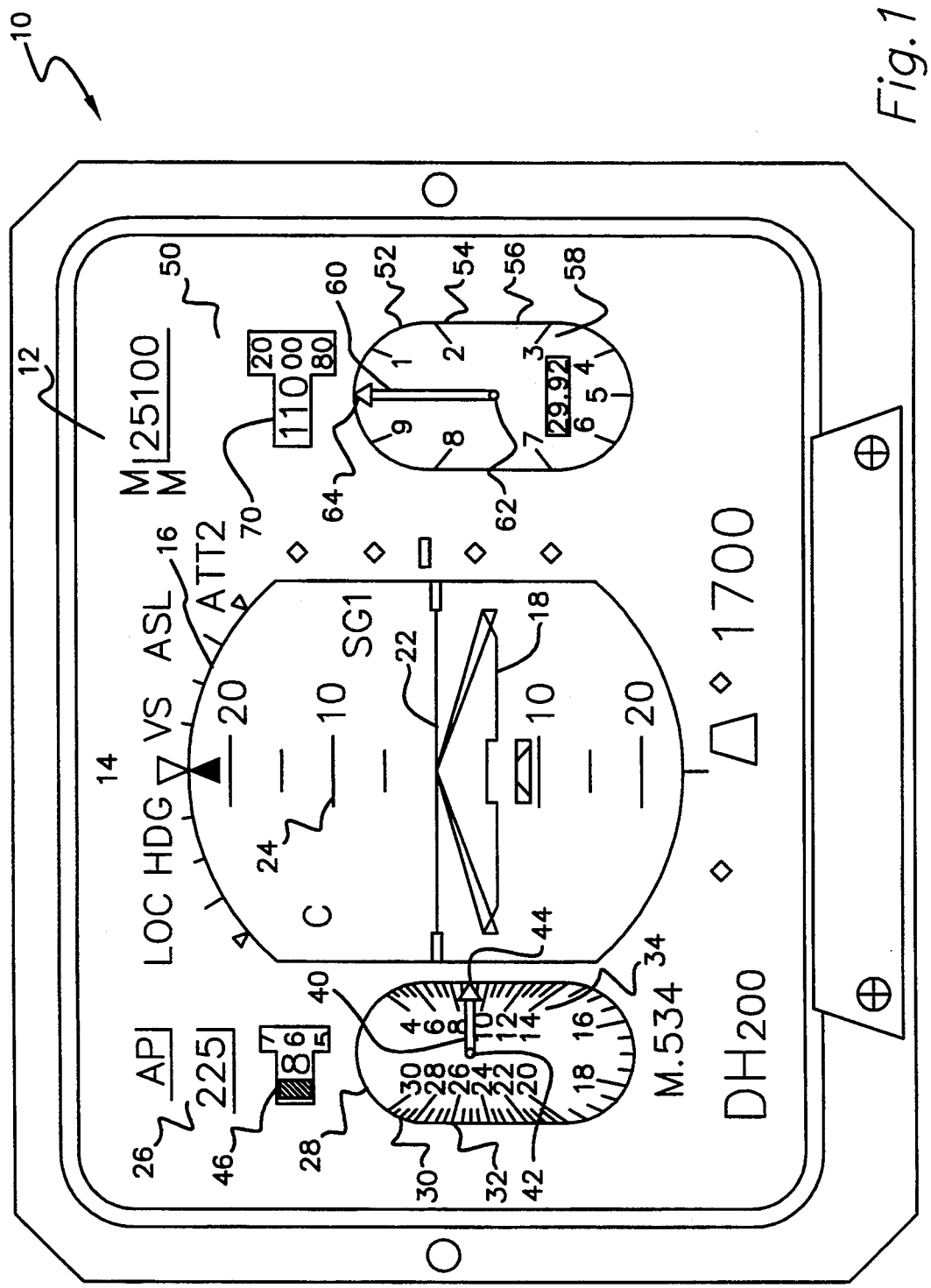
FIG. 1 is a frontal view of a first embodiment of a primary flight display in accordance with the present invention.

A display produced in accordance with the present invention is illustrated in FIG. 1 and generally designated 10. Display 10 would be presented on a cathode ray tube or other electronic display means having a display field 12. Display field 12 may be divided into a number of indicators or indicating areas. A first central area 14 includes an electronic attitude director indicator (EADI) 16. EADI 16 provides aircraft attitude information and includes an aircraft reference symbols 18 and 20, an artificial horizon 22, and flight director command bars 24, and is of generally conventional design.

Adjacent and along the left side of EADI 16 is a second area which includes an air speed presentation 26. Airspeed presentation 26 includes airspeed dial display 28 having scale markings 30 generally located at perimeter 32 of dial display 28, and numbers 34 located adjacent some of scale markings 30, dial display 28 also includes movable pointer 40. Pointer 40 has a fixed end at center 42 of dial display 28 and a rotating end 44. Pointer 40 extends from center 42 to or nearly to perimeter 32 and rotates about center 42. In accordance with the teachings of the present invention airspeed dial display 28 is elongated vertically to take advantage of the increased vertical display area that is available at the left side of EADI 16. By configuring dial display 28 to be expanded vertically, significantly more display area is available for dial display 28 than would be available if a circular configuration were used. By expanding display area, the readability of dial display 28 is greatly improved.

A rolling drum display or window 46 is located external to dial display in a first embodiment as shown in FIG. 1. Rolling drum display 46 digitally displays a present value of airspeed.

Adjacent and along the right side of EADI 16 is a third area which includes an altitude presentation or altimeter 50.

Altitude presentation 50 includes altitude dial display 52 having scale markings 54 generally located at perimeter 56 of dial display 52, and numbers 58 located adjacent some of scale markings 54. Dial display 52 also includes movable pointer 60. Pointer 60 has a fixed end at center 62 of dial display 52 and a rotating end 64. Pointer 62 extends from center 62 to or nearly to perimeter 56 and rotates about center 62. In accordance with the teachings of the present invention altitude dial display 52 is elongated vertically to take advantage of the increased vertical display area that is available at the right side of EADI 16. By configuring dial display 52 to be expanded vertically, significantly more display area is available for dial display 52 than would be available if a circular configuration were used. By expanding display area, the readability of dial display 52 is greatly improved.

A rolling drum display or window 70 is located external to dial display 52 in a first embodiment as shown in FIG. 1. Rolling drum display 70 digitally displays a present value of altitude.

Now that the construction and operation of primary flight display 10 have been set forth, many advantages and subtle features can be set forth and appreciated. PFD 10 preserves the required PFD concept of the "basic T" flight instrument format, i.e., airspeed, attitude, altimeter and heading information form the shape of the letter "T" on the PFD.

Airspeed presentation 26 makes near optimum use of the available area located on the left side of EADI 16. The combination of a vertically elongated dial display 28 and rolling drum display 46 provides several advantages. Dial display 28 provides both global or macroscopic airspeed information and highly readable airspeed information. Dial display 28 clearly displays a wide range of airspeeds around perimeter 32 due to the lengthened height of dial display 28 when compared to a circular display that could be provided in the very limited horizontal available space located to the right of EADI 16. Dial display information visually available from dial display 28 includes the relative position of pointer 40 relative to scale markings 30, i.e. the reading of round dial display 34. The expanded vertical dimension of dial display 28 provides a greatly lengthened scale which translates to scale markings 30 which provide high resolution readings of airspeed to be easily made. Additional airspeed information is imparted through the direction of pointer 40 and further information is imparted through the direction of rotation of pointer 40, that is either clockwise for increasing airspeed or counterclockwise for decreasing airspeed.

Information available from dial display 28 therefore provides improved situational awareness over past airspeed displays that provide only a movable vertical scale and a window for a digital display.

Altitude presentation or altimeter 50 makes near optimum use of available display area located on the right side of EADI 16. The altimeter display of the present invention provides a unique combination of an altitude dial display 52 and a rolling drum display 70. Vertically elongated altitude display 52 is configured so that pointer 64 makes a complete revolution on dial face 62 for a predetermined change in altitude. For example scale markings 66 could be spaced to correspond to an altitude change of 100 feet between scale markings 66 so that a complete revolution of pointer 64 would correspond to 1000 feet change in altitude. It will be appreciated that dial display 58 would then impart information through the direction of rotation of pointer 64 i.e. clockwise rotation for increasing altitude and counterclockwise for decreasing altitude. In addition dial display 58 will impart information through the rate of rotation of pointer 64.

Rolling drum display 70 provides a digital display of the present value of altitude.

Figure 2:
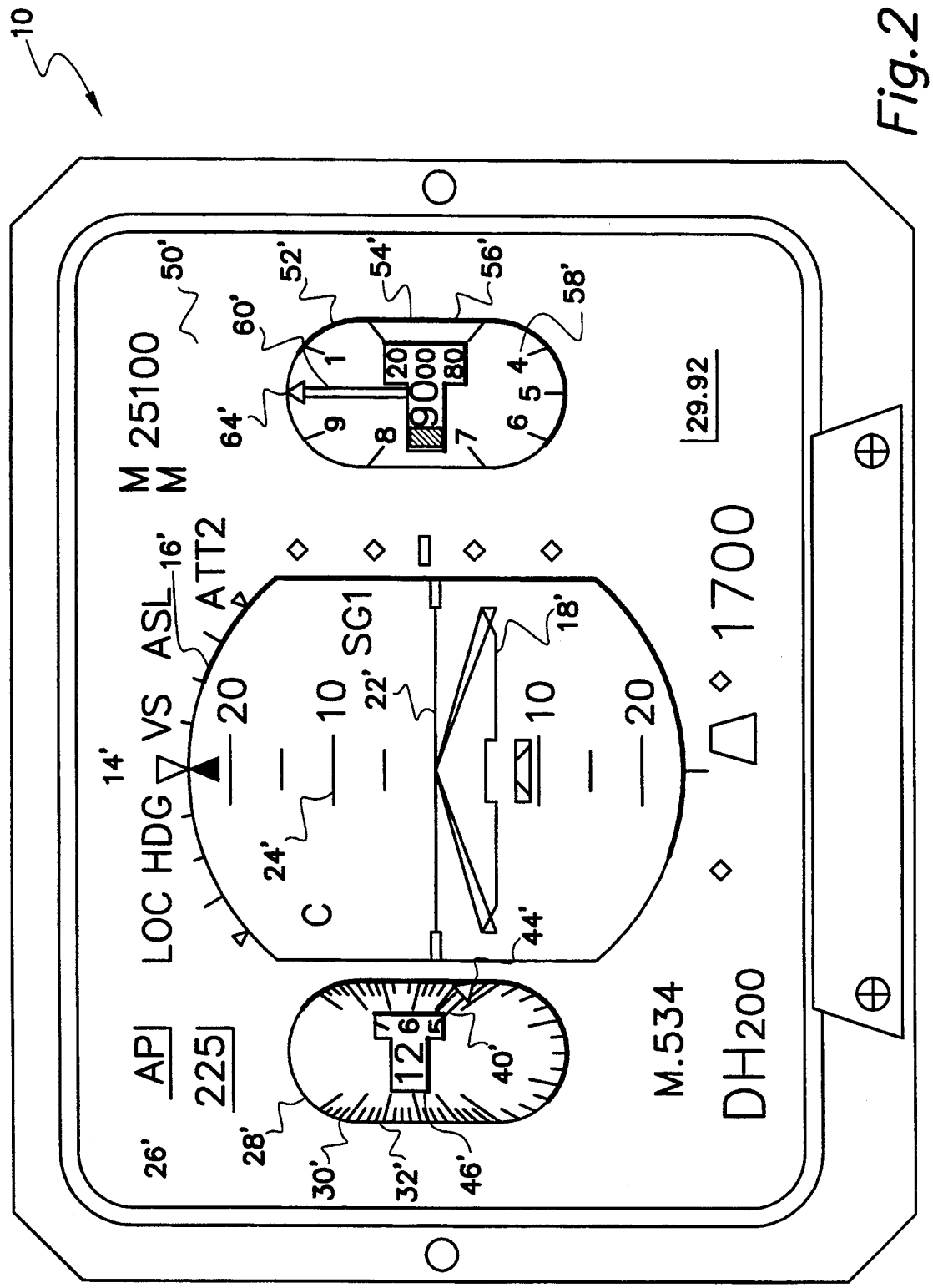
FIG. 2 is a frontal view of an alternate embodiment primary flight display in accordance with the present invention.

A first alternate embodiment of display 10 is shown in FIG. 2 where similar parts are designated by '. In FIG. 2 airspeed presentation 26' includes airspeed dial display 28' having scale markings 30' located generally along perimeter 32'. The numbers 34 of FIG. 1 are not included in the alternate embodiment of FIG. 2. Rolling drum display 46' is located within airspeed dial display 28' in the first alternate embodiment. Rolling drum display 64' of altitude presentation 50 is located within altitude dial display 52' in the first alternate embodiment.

Figure 3:
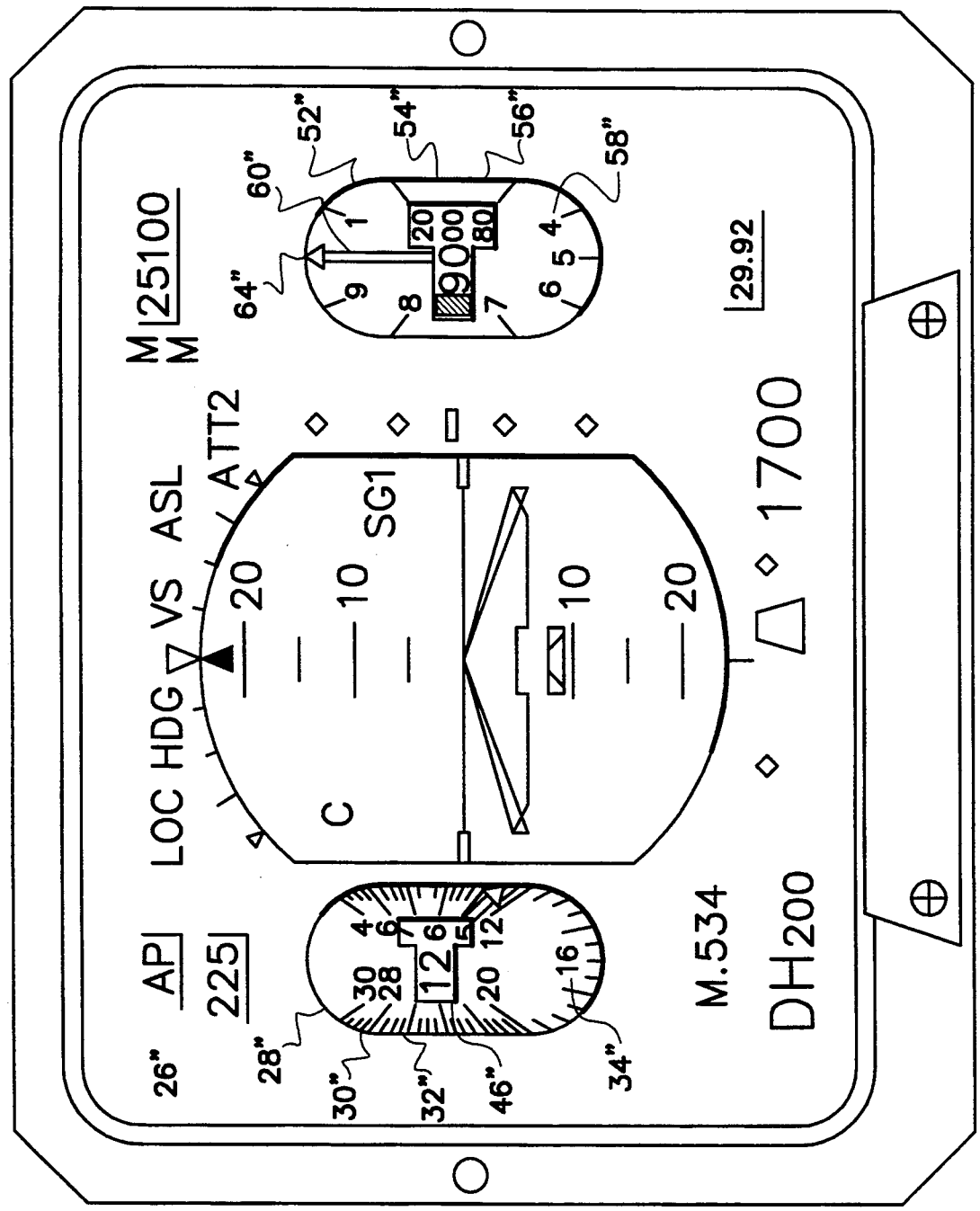
FIG. 3 is a frontal view of a second alternate embodiment of a primary flight display in accordance with the present invention.

A second alternate embodiment of display 10 is shown in FIG. 3 where similar parts are designated by ". In FIG. 3 airspeed presentation 26" includes airspeed dial display 28" having scale markings 30" located generally along perimeter 32". Numbers 34" are shown adjacent selected scale markings 30".

In accordance with the foregoing description, applicants have developed unique configurations for the airspeed display portion and the altimeter portion of a primary flight display. Applicants' invention can be readily incorporated into the display space available in typical primary flight displays.

Although a specific embodiment of Applicant's invention is shown for illustrative purposes, a number of variations will be apparent to those of ordinary skill in the relevant arts. It is not intended that coverage be limited to the disclosed embodiment, but only by the terms of the following claims.

We claim:

1. A primary flight display for an aircraft, comprising:
   a display field including a central attitude indicator;
   an elongated, vertically disposed airspeed dial located on a first side of said central attitude director, said airspeed dial having a first movable pointer;
   a first rolling drum display, for digital display of a present value of airspeed, located adjacent said airspeed dial;
   means responsive to the airspeed of said aircraft for moving said first movable pointer to display macro airspeed information on said airspeed dial and changing said rolling drum display to display a present value of airspeed;
   an elongated primarily vertically disposed altitude dial located on a second side of said central attitude director, said altitude dial having a second movable pointer,
   a second rolling drum display, for digital display of a present value of altitude, located adjacent said altitude dial;
   means responsive to the altitude of said aircraft for moving said second movable pointer in response to a change in aircraft altitude and changing said second rolling drum display to display a present altitude value.

2. Primary flight display of claim 1 wherein said first rolling drum display is located within said airspeed dial.

3. Primary flight display of claim 2 wherein said elongated vertically disposed airspeed dial includes scale markings and said scale markings are separated by a distance corresponding to a change in airspeed in the range of 1 to 10 knots per hour.

4. Primary flight display of claim 3 wherein said elongated vertically disposed airspeed dial includes numbers adjacent at least some of said scale markings.

5. Primary flight display of claim 1 wherein said adjacent airspeed dial includes scale markings separated by a distance corresponding to a change in airspeed in the range of 1 to 10 knots per hour.

6. Primary flight display of claim 1 wherein said second rolling drum display is located within said elongated vertically disposed altitude display.

7. Primary flight display of claim 1 wherein said elongated vertically disposed airspeed dial is configured as a primary speed awareness cue providing a global perspective of airspeed by the position of said first movable pointer.

8. Primary flight display of claim 1 wherein said elongated vertically disposed altitude display dial and said second movable pointer are configured to provide a complete revolution of said second movable pointer for a predetermined change in altitude.

9. Primary flight display of claim 8 wherein said elongated vertically disposed altitude dial includes numbers adjacent at least some of said scale markings.

10. Primary flight display of claim 8 wherein said predetermined change in altitude is 1 revolution of said second movable pointer corresponds to a change of 1000 feet in altitude.

11. Primary flight display of claim 1 wherein said elongated vertically disposed altitude dial includes scale markings and said scale markings are separated by a distance corresponding to a predetermined change in altitude.

* * * * *